United States Patent [19]

Hardwick

[11] Patent Number: 4,518,111
[45] Date of Patent: May 21, 1985

[54] METHOD OF FABRICATING A BI-METAL TUBE

[75] Inventor: Roy Hardwick, Louisville, Colo.

[73] Assignee: Explosive Fabricators, Inc., Louisville, Colo.

[21] Appl. No.: 542,532

[22] Filed: Oct. 17, 1983

[51] Int. Cl.³ ............................................. B23K 20/08
[52] U.S. Cl. .................................. 228/107; 228/108; 228/175
[58] Field of Search ....................................... 228/2–5, 228/107, 108, 109, 175; 376/417

[56] References Cited

U.S. PATENT DOCUMENTS

| | | | |
|---|---|---|---|
| 3,535,767 | 10/1970 | Doherty et al. | 228/107 |
| 3,740,826 | 6/1973 | Baba | 228/107 |
| 4,039,870 | 8/1977 | Sterrett | 228/107 |
| 4,045,288 | 8/1977 | Armijo | 376/417 |

*Primary Examiner*—Kenneth J. Ramsey
*Assistant Examiner*—M. Jordan
*Attorney, Agent, or Firm*—Fields, Lewis, Pittenger & Post

[57] ABSTRACT

A method of forming a composite tube having an inner thin liner or layer of expensive material surrounded by a thick layer of less expensive material has been provided. A thin-walled tube of the expensive material is placed inside a thin-walled tube of a less expensive material and the outer tube is imploded by explosives to be metallurgically bonded to the inner tube. The composite billet thus formed is then placed within a third tube of any desired wall thickness which is of the same or similar material as the second tube. This composite is then co-extruded causing the like materials of the outer most tubes to be metallurgically bonded to each other. By this method, the relative ratios of the expensive and common materials can be selected as required by the particular use to be made of the billet and the diameters thereof can similarly be optimumly selected.

10 Claims, 4 Drawing Figures

METHOD OF FABRICATING A BI-METAL TUBE

DESCRIPTION

1. Technical Field

This invention relates to a method of producing a bi-metal tube consisting of an exterior tubular component of comparatively inexpensive but structurally strong material, together with an interior or liner tube of corrosion resistant and expensive material, such as zirconium. More particularly, the invention relates to such a tube which is formed in a process which includes explosively bonding two unlike tubular materials together to form a metallurgical bond and then co-extruding the composite tubular members made of the same metal as the outer portion of the composite tube to form a metallurgical bond between the like metals.

2. Background Art

Bi-metal tubes have been used in heat exchanger construction over a period of many years. Bi-metal tubes are used in heat exchangers in which there are two differing corrosive fluids flowing, one on the shell side (exterior of the tube) and the other on the tube side (interior of the tube). It is sometimes difficult to find a tube material which is not susceptible to corrosion from at least one of the two fluid environments and consequently a bi-metal tube is made, the outer tube being resistant to the shell side environment and the inner tube to the tube side environment. In the past, one way of making these tubes was by co-drawing, i.e., a first tube made from one metal is placed inside a second tube made from a second metal and both tubes are drawn through a die and over a mandrel to form a composite tube. To effect this co-drawing, the inner tube must fit reasonably tight within the outer tube. The composite thickness will just exceed that of the final co-drawn dimension. The thickness of the two tubes must be of reasonable dimension to promote the required hoop-stresses which will maintain the two tubes in contact at their interface. The requirements outlined above provide a tube which is less than ideal in that its composite thickness is so great that it results in relatively low heat transfer across the tube wall. Additionally, thermal and fatigue cycling, arising during the operation of the heat exchanger, usually results in separation along the contact area at the interface whereby the resulting gap will further inhibit heat transfer.

More recently, a new type of bi-metal tube has been produced. The innovative feature of this new tube is that the outer and inner tubes are explosively bonded together so that a metallurgical bond exists between the two tubes at the interface. Appropriate size tubes are selected at relatively large diameters and thicknesses and these two tubes are explosively bonded to form a composite shell (i.e., a tube of large diameter and wall thickness). This composite tube can then be drawn down as if it were a single entity due to the strength of the interfacial bond. This was not possible with co-drawn tubing as it merely resulted in the preferential drawing of the lower yield strength material. However, in the case of the bonded composite, the strength of the bond prevents this preferential drawing. As this composite tube behaves as a single entity, it is possible for it to be drawn down to a much thinner gauge than could be done by the co-drawing technique. Thus, the composite has improved heat transfer characteristics. Due to the strength of the bond, thermal and fatigue cycling resulting from operating stresses cannot adversely affect the bond and thus, again, heat transfer characteristics are maintained.

There are, however, some limitations to the process. The bond can be made by either of two methods. By one method, the exterior tube is surrounded by explosive which, in initiation, contracts or implodes the outer tube down onto the inner tube. This method requires that the inner tube be supported internally to prevent its collapse. The advantage of the technique is that the requisite, and indeed unlimited, amount of explosive can be placed around the outer tube. Its major disadvantage is that very thick outer tubes cannot be imploded successfully. This is because the intervening gap initially between the tubes (stand-off gap) must be sufficient to allow the tube to accelerate to an acceptable velocity which will give an appropriate collision pressure for bonding. As thicker tubes accelerate more slowly, the stand-off gap required for acceleration is unacceptably large. The gap increases to a point where, on collapse, wrinkling of the outer tube bore occurs before contact with the inner tube. These considerations generally limit the size of shell which can be produced. Normally the ratio of outer to inner tube wall thicknesses would not exceed 6:1 and the outer wall thickness would not exceed 1 inch.

By the other method, the inner tube can be expanded outward to bond to the bore of the outer tube. The advantage of this method is primarily the simplicity of the set up, particularly if the outer tube is of substantial thickness such that a die is not necessary to restrain the expansion of the outer tube. Consequently it is mainly used for those applications where the outer to inner tube wall thickness exceeds 6:1 ratio. A severe disadvantage is that the bore of the inner tube must be sufficiently large to contain the requisite amount of explosive to achieve bonding. This requirement imposes severe lower limits to both the size of the bore and wall thickness of the inner tube. For example, if the bore size is to be reduced, this can only be achieved by reducing the inner tube wall thickness thereby reducing the requisite amount of explosive.

A desirable composite shell should be of maximum dimensions in order to produce a sizeable yield of drawn composite tube. The cost of bonding is then distributed over the greater product volume thereby reducing its production cost. These prior art methods of bonding, however, because of the considerations outlined, determine the bore or inside diameter (I.D.), wall thickness and outside diameter (O.D.) dimensions of the shell which may not be appropriate from an economic standpoint. Moreover, these dimensions may also be unsuitable for drawing on the particular equipment to be used.

DISCLOSURE OF THE INVENTION

The invention relates to a method of forming a composite billet or tube from dissimilar metals. This method comprises placing a first tube of a first metal within a second larger tube made of a second metal which is dissimilar from the first metal in parallel spaced relation, explosively bonding the first and second tubes to form a composite tube, placing the composite tube in a third tube and co-extruding the third tube and the composite tube to form a metallurgical bond between the third tube and the second tube.

More particularly, the billet is produced by placing a first tube of corrosion resistant material, for example zirconium, within the bore of a thin-walled outer tube of inexpensive metal such as steel, so that an annular stand-off gap is formed concentrically between the two components. An explosive charge of appropriate weight is placed to surround the outer tube concentrically and over its length. The explosive charge is detonated at one end of the tube so that the detonation front progresses at a controlled rate through the explosive and progressively deforms the outer tube inwards thereby collapsing it to form a collision front between the tubes which progresses down the tubes at a rate identical to that of the detonation rate of the explosive. Under these conditions the two tubes are metallurgically bonded at the interface to form a composite tube.

The composite tube is placed within the bore of a thick-walled tube of identical or similar material to that of the thin-walled outer tube of the composite. The inner composite tube is then expanded into contact with the outer tube or alternatively, the interfacial gap is evacuated and sealed by fusion welding. The newly formed composite assembly is pre-heated to an appropriate temperature and is co-extruded by the conventional hot extrusion process. During co-extrusion a second metallurgical bond is formed between the compatible materials of the thick-walled outer tube and thin-walled outer tube of the explosively bonded tube. This compounded composite is further drawn, by conventional drawing techniques, down to the final required tube size.

Several advantages of the method are apparent. By imploding the thin outer tube onto the corrosion resistant inner tube to form the explosively bonded composite, there is no lower limit to the bore diameter of the composite and the bore size can be freely selected on the basis of the size of the extrusion equipment and specifically the size of the extrusion mandrel. The outside diameter of the thick outer tube to be co-extruded can also be freely selected to be suitable for the particular bore size of the extrusion press container. Additionally there is no destruction of wall thickness during hot extrusion when the second metallurgical bond is formed. The composite thickness of the thin outer wall of the explosively bonded composite and the thick-walled outer tube can, therefore, be adjusted to give an appropriate ratio of wall thickness between the inner tube, of corrosion resistant metal, and less expensive outer tube material. The ratio can be freely selected so that when the shell is subsequently drawn by conventional techniques, the final tube may have an inner tube of minimum thickness consistant with corrosion resistance requirements only and with no regard to the previous restrictions imposed by the explosive bonding process.

A further advantage is that the thin-walled outer tube of the explosively bonded composite may be of a low carbon or carbon free steel compatible with the thick-walled outer tube. On subsequent heat treatment, the migration of carbon into the zirconium is thus minimized or prevented and the detrimental effects of such migration are consequently avoided.

Additional advantages of the invention will become apparent from the description which follows, taken in conjunction with the accompanying drawings.

BEST MODE FOR CARRYING OUT THE INVENTION

Figure 1:
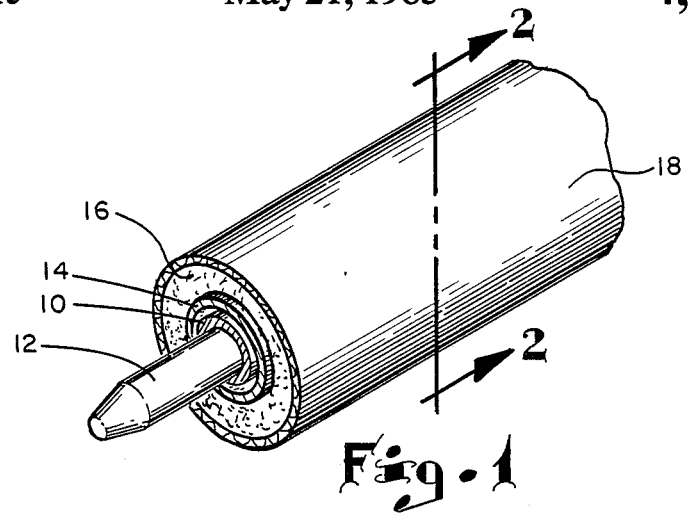
FIG. 1 is a fragmentary perspective view of the arrangement of the first and second tubes and the explosive prior to detonation.
Figure 2:
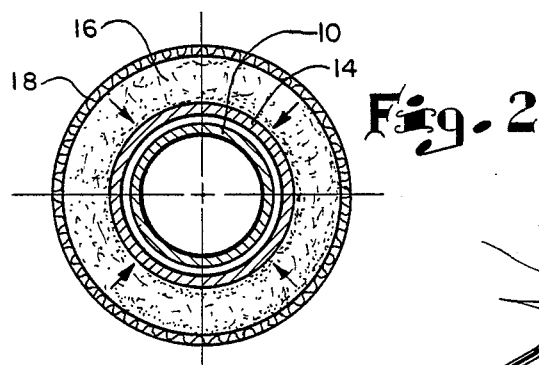
FIG. 2 is a vertical section, taken along line 2—2 showing further details of the arrangement of the parts prior to detonation.

In accordance with the method of this invention, a thin-walled tube 10 is preferably mounted on a mandrel 12 and is made of a relatively expensive material, such as zirconium. A second, larger, outer tube 14 is placed over inner tube 10 and is sized so that the inside diameter of the outer tube 14 is spaced from the outside diameter of inner tube 10 by suitable standoff distance so that the two tubes can be explosively bonded together as described below. Conveniently, outer tube 14 can be made of a less expensive material, such as steel.

An explosive 16, such as amatol powder is packed uniformly around outer tube 14 and can be held in place by any suitable means such as a cardboard cylinder 18. The explosive should have a detonation rate in the range of 1,800 to 2,600 meters per second.

Figure 3:
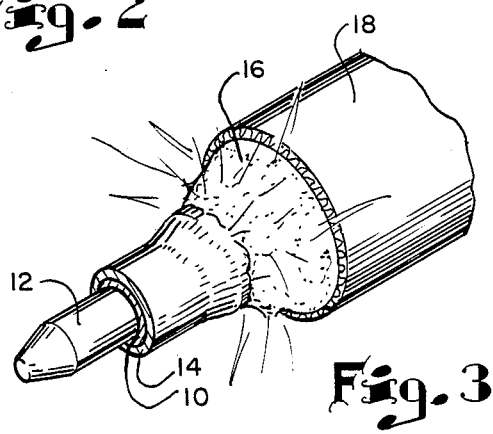
FIG. 3 is a fragmentary perspective view, similar to FIG. 1, but showing the explosive being detonated and the metallurgical bonding of the tubes after detonation.

The explosive 16 will be detonated at one end of the tubes so that the outer tube 14 is imploded against the inner tube 12, as shown in FIG. 3 to form a composite billet wherein a metallurgical bond is formed between tubes 10 and 14. The use of mandrel 12 is optional and will depend primarily on the respective thicknesses of the tubes and the amount of explosive needed. For a very thin-walled tube 10, the mandrel is needed to keep the inner tube from deforming. On the other hand, if it is desired to have a relatively thick-walled tube 10, the mandrel may not be necessary.

Figure 4:
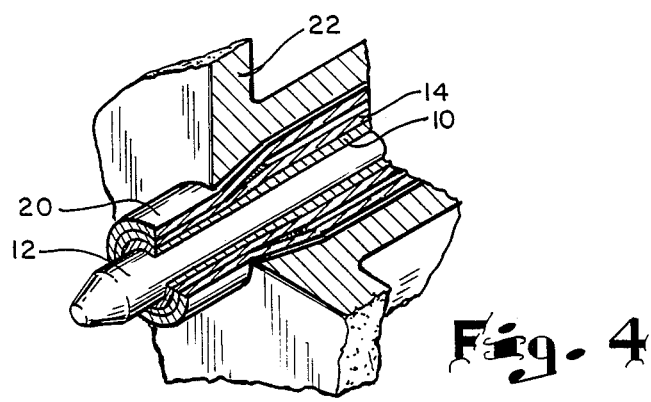
FIG. 4 is a fragmentary perspective view, with parts broken away for clarity of illustration, showing the composite tube of FIG. 3 being co-extruded with a third tube to form a composite billet.

The composite billet is placed inside a larger tube 20 which is made of the same or similar material as tube 14. The composite billet and tube 20 are then preheated to a temperature of approximately 1,500°–1,550° F. and co-extruded through a die 22, as shown in FIG. 4 wherein a metallurgical bond is created between tubes 20 and 14. Thus, a final composite billet is formed having a very thin inner wall 10 of an expensive material and a relatively thick wall of less expensive material. It can be seen by this method almost any inner and outer wall tube thickness can be obtained. In those situations where only a thin liner of expensive material is necessary to prevent corrosion of a less expensive material, the invention is particularly beneficial. The less expensive material may be a low carbon or carbon free steel so that carbon particles will not migrate into the expensive material, such as zirconium.

By way of specific example, a zirconium-steel composite billet was made from a zirconium tube having 3.13" O.D. and 1.93" I.D. and a steel tube of 3.875" O.D. and 3.375" I.D. The outside of the zirconium tube and the inside of the steel tube were abrasively cleaned before locating the zirconium tube concentrically within the bore of the steel tube. The bore of the zirconium tube was supported by a mandrel. A cardboard tube of appropriate dimension was placed concentrically around this composite assembly and the annulus was filled with amatol powder explosive. The explosive charge was initiated at one end to implode the steel tube onto the exterior surface of the zirconium and form an explosively bonded composite or billet. The dimensions of this resulting composite were 3.66" O.D. and 1.93" I.D. and 2'0" in length.

The bore was then machined out to 2.76" diameter to leave the required wall thickness of zirconium which was appropriate to the ultimately required steel-zirconium wall thickness ratio of 12:1. The outside surface of the composite was machined to 3.5" O.D. principally to clean up the surface for subsequent extrusion and secondly to establish dimensional uniformity of the O.D. The composite was then inserted into the bore of a steel billet which was 7.86" O.D. and 3.55" I.D. and 2'0" in length. The inner facial gap was evacuated and a steel weld that was made between the exterior steel portion of the composite and the bore of the steel billet. This composite was hot extruded by means of an extrusion press at a temperature between 1,500° and 1,550° to produce a metallurgical bond between the steel exterior surface of the zirconium-steel explosively bonded composite billet and the steel bore surface of the larger steel billet. The second composite tube was thus formed having a steel-zirconium wall thickness ratio of the required 12:1. The composite billet was then drawn down by conventional drawing techniques to a final size of 2.875" O.D. and 2.375" I.D., the tube having a zirconium lining of approximately 0.020" in thickness.

The boring out of the tubes is not necessary if the available diameters of tubing provide the right ratio in diameters and thicknesses to that which is desired.

From the foregoing, the advantages of this invention are readily apparent. There is no lower limit to the bore diameter of the composite and the bore size can be freely selected on the basis of the size of the extrusion equipment and specifically the size of the extrusion mandrel. Also, the thick outer tube can be selected any suitable size for co-extrusion with the composite tube that has been formed so that the relative ratio of the thickness of the zirconium or other expensive material to the lesser expensive material or steel can be chosen at any optimum amount.

The invention has been described in detail with particular reference to preferred embodiments thereof, but it will be understood that variations and modifications can be effected within the spirit and scope of the invention.

I claim:

1. A method of forming a composite billet from dissimilar metals, said method comprising:
    placing a first tube of a first metal within a second, larger tube in parallel spaced relation, the larger tube being made of a second metal which is dissimilar from the first metal;
    explosively bonding the first and second tubes to form a composite tube;
    placing the composite tube in a third tube; and
    co-extruding the third tube and the composite tube to form a metallurgical bond between the third tube and the second tube.

2. A method, as claimed in claim 1, wherein:
    the third tube is made of the same metal as the second tube.

3. A method, as claimed in claim 1, wherein:
    the second tube is thin-walled; and
    the third tube is thick-walled.

4. A method, as claimed in claim 1, wherein:
    the first tube is made of corrosion resistant metal.

5. A method, as claimed in claim 4, wherein:
    the first tube is made of zirconium; and
    the second and third tubes are made of steel.

6. A method of forming a composite tube having an interior liner which is of a dissimilar material to the body of the tube and is metallurgically bonded thereto, said method comprising the steps of:
    placing a first tube of corrosion resistant material within a second, thin-walled tube of dissimilar metal;
    surrounding the second tube with an explosive;
    detonating the explosive charge at one end of the second tube so that the detonation front progresses at a controlled rate through the explosive and progressively deforms the second tube inwardly collapsing it to form a collision front between the tubes which progresses down the tubes at a rate identical to that of the detonation rate of the explosive to metallurgically bond the tubes to form a composite tube;
    placing the composite tube within the bore of a third thick-walled tube of the same material as the second tube;
    mechanically joining the second tube and the third tube together;
    heating the composite tube; and
    co-extruding the heated composite tube to form a metallurgical bond between the second tube and the third tube.

7. A method, as claimed in claim 6, including the further step of:
    drawing the composite to a final required tube size.

8. A method, as claimed in claim 6, wherein:
    a mandrel is placed in the first tube prior to detonating the explosive charge.

9. A method, as claimed in claim 6, wherein:
    said thin-walled tube is made of low carbon steel.

10. A method, as claimed in claim 6, wherein:
    said thin-walled tube is made of carbon free steel.

* * * * *